UNITED STATES PATENT OFFICE.

CHARLES F. PANKNIN, OF CHARLESTON, SOUTH CAROLINA.

IMPROVEMENT IN FERTILIZERS.

Specification forming part of Letters Patent No. 193,890, dated August 7, 1877; application filed April 16, 1877.

*To all whom it may concern:*

Be it known that I, CHARLES F. PANKNIN, of the city and county of Charleston, South Carolina, have invented a new and Improved Fertilizing Compound, of which the following is a specification:

My invention relates to a compound consisting of a mixture of finely-powdered bone or mineral phosphates and finely-powdered sulphur, the said ingredients being mixed together and applied in a dry state, and the conversion of the insoluble phosphate of lime into soluble phosphate of lime is effected by the sulphuric acid eliminated by the natural oxidation of the sulphur of the mixture in the soil to which it is applied.

To prepare the fertilizing compound, take ninety-five parts of insoluble phosphates, (either bone or mineral phosphate,) in a finely-powdered state, and mix with it five parts of finely-powdered sulphur, both ingredients being in a dry state, though I do not confine myself to these proportions. This mixture, though only mechanical in its character, when applied to the soil, becomes slowly transformed, the sulphur being first converted into sulphuric acid by a natural process of oxidation, and, when so converted, uniting with the insoluble phosphates to form a soluble phosphate, which is dissolved by the moisture of the soil, and acts in the same manner as phosphates made by artificial processes.

The advantage of this method of manufacturing soluble phosphates are twofold:

First, the mixture contains no sulphate of lime and no water of combination, requires no expensive machinery to make the mixture, and therefore the cost is less as compared with superphosphates prepared with sulphuric acid.

Second, as the ingredients are mixed together in a dry state, with sulphur in so small a proportion, the percentage of phosphate of lime in the compound is greater as compared with that in the superphosphates prepared in the usual way.

Having thus described my invention, I claim as new and desire to secure by Letters Patent—

A compound consisting of ninety-five parts of phosphate of lime and five parts of sulphur, each having been comminuted and mixed, as described.

CHARLES F. PANKNIN.

Witnesses:
 J. J. LEGARÉ,
 GUSTAV HEDRICK.